United States Patent
Chen et al.

(10) Patent No.: US 12,267,708 B2
(45) Date of Patent: Apr. 1, 2025

(54) SOUNDING REFERENCE SIGNAL RESOURCE SET CONFIGURATION FOR ANALOG CHANNEL STATE FEEDBACK

(71) Applicant: QUALCOMM Incorporated, San Diego, CA (US)

(72) Inventors: Bo Chen, Beijing (CN); Ruifeng Ma, Beijing (CN); Yu Zhang, San Diego, CA (US); Pavan Kumar Vitthaladevuni, San Diego, CA (US); Chenxi Hao, Beijing (CN); Joseph Binamira Soriaga, San Diego, CA (US); Krishna Kiran Mukkavilli, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 17/595,221

(22) PCT Filed: May 27, 2020

(86) PCT No.: PCT/CN2020/092562
§ 371 (c)(1),
(2) Date: Nov. 11, 2021

(87) PCT Pub. No.: WO2020/248818
PCT Pub. Date: Dec. 17, 2020

(65) Prior Publication Data
US 2022/0210676 A1    Jun. 30, 2022

(30) Foreign Application Priority Data
Jun. 12, 2019 (WO) ................ PCT/CN2019/090818

(51) Int. Cl.
| H04B 7/06 | (2006.01) |
| H04L 5/00 | (2006.01) |
| H04W 24/08 | (2009.01) |

(52) U.S. Cl.
CPC .......... *H04W 24/08* (2013.01); *H04B 7/0626* (2013.01); *H04L 5/0048* (2013.01)

(58) Field of Classification Search
None
See application file for complete search history.

(56) References Cited

U.S. PATENT DOCUMENTS

| 10,103,798 B2 | 10/2018 | Rahman et al. |
| 2013/0322288 A1 | 12/2013 | Zhang et al. |

(Continued)

FOREIGN PATENT DOCUMENTS

| CN | 105406911 A | 3/2016 |
| CN | 107294585 A | 10/2017 |

(Continued)

OTHER PUBLICATIONS

Huawei, et al., "Discussion on analog CSI feedback", 3GPP TSG RAN WGI Meeting #84bis, R1-162595, Apr. 15, 2016 (15.04.2016), 7 pages, pp. 2-4.

(Continued)

*Primary Examiner* — Jenkey Van
(74) *Attorney, Agent, or Firm* — QUALCOMM Incorporated

(57) ABSTRACT

Various aspects of the present disclosure generally relate to wireless communication. In some aspects, a user equipment (UE) may receive a configuration that indicates a sounding reference signal (SRS) resource set to be used for analog channel state feedback (CSF) and an association between the SRS resource set and a set of downlink channel state information reference signals (CSI-RSs). The UE may mea- (Continued)

sure the set of downlink CSI-RSs associated with the SRS resource set. The UE may transmit one or more SRSs for analog CSF using the SRS resource set and based at least in part on measuring the set of downlink CSI-RSs. Numerous other aspects are provided.

30 Claims, 9 Drawing Sheets

(56) References Cited

U.S. PATENT DOCUMENTS

| | | | |
|---|---|---|---|
| 2016/0381589 A1 | 12/2016 | Zhang et al. | |
| 2017/0237535 A1 | 8/2017 | Park et al. | |
| 2018/0287757 A1 | 10/2018 | Onggosanusi | |
| 2021/0083824 A1* | 3/2021 | Wernersson | H04L 5/0051 |
| 2021/0250206 A1* | 8/2021 | Liu | H04L 25/0226 |
| 2022/0094500 A1* | 3/2022 | Liu | H04W 52/325 |
| 2022/0116979 A1* | 4/2022 | Park | H04B 7/0628 |
| 2022/0166587 A1* | 5/2022 | Go | H04L 5/0048 |

FOREIGN PATENT DOCUMENTS

| | | |
|---|---|---|
| CN | 107370533 A | 11/2017 |
| CN | 109690969 A | 4/2019 |
| WO | 2018192350 A1 | 10/2018 |
| WO | 2019066560 A1 | 4/2019 |

OTHER PUBLICATIONS

International Search Report and Written Opinion—PCT/CN2019/090818—ISA/EPO—Mar. 13, 2020.
International Search Report and Written Opinion—PCT/CN2020/092562—ISAEPO—Aug. 21, 2020.
LG Electronics: "Feature Lead Summary#3 of Enhancements on Multi-Beam Operations", 3GPP TSG RAN WG1 Meeting #97, R1-1907860_R1#97_FL_SUMMARY#3_MULTIBEAM (MB1), 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 17, 2019 (May 17, 2019), XP051740132, pp. 1-35, p. 18, p. 26, p. 32, Section 3.5.
Nokia, et al., "Enhancements on Multi-Beam Operation", 3GPP TSG RAN WG1 #97 Meeting, R1-1907317, 3rd Generation Partnership Project (3GPP), Mobile Competence Centre, 650, Route Des Lucioles, F-06921, Sophia-Antipolis Cedex France, vol. RAN WG1, No. Reno, Nevada, USA, May 13, 2019-May 17, 2019, May 13, 2019, XP051728756, 22 Pages, XP051709339, sections 2 and 3, paragraph [0002], the whole document.
Supplementary European Search Report—EP20823233—Search Authority—The Hague—May 30, 2023.

* cited by examiner

```
SRS-ResourceSet ::=            SEQUENCE {
    srs-ResourceSetId              SRS-ResourceSetId,
    srs-ResourceIdList             SEQUENCE (SIZE(1..maxNrofSRS-ResourcesPerSet)) OF SRS-
ResourceId    OPTIONAL,   -- Cond Setup resourceType                   CHOICE {
        aperiodic                      SEQUENCE {
            aperiodicSRS-ResourceTrigger   INTEGER (1..maxNrofSRS-TriggerStates-1),
            csi-RS                         NZP-CSI-RS-ResourceId
                OPTIONAL,  -- Cond NonCodebook
            slotOffset                     INTEGER (1..32)
                OPTIONAL,  -- Need S
            ...
        },
        semi-persistent                SEQUENCE {
            associatedCSI-RS               NZP-CSI-RS-ResourceId
                OPTIONAL,  -- Cond NonCodebook
            ...
        },
        periodic                       SEQUENCE {
            associatedCSI-RS               NZP-CSI-RS-ResourceId
                OPTIONAL,  -- Cond NonCodebook
            ...
        }
    },
    usage                          ENUMERATED {beamManagement, codebook, nonCodebook,
antennaSwitching, analogCsf},
    ...
```

FIG. 5

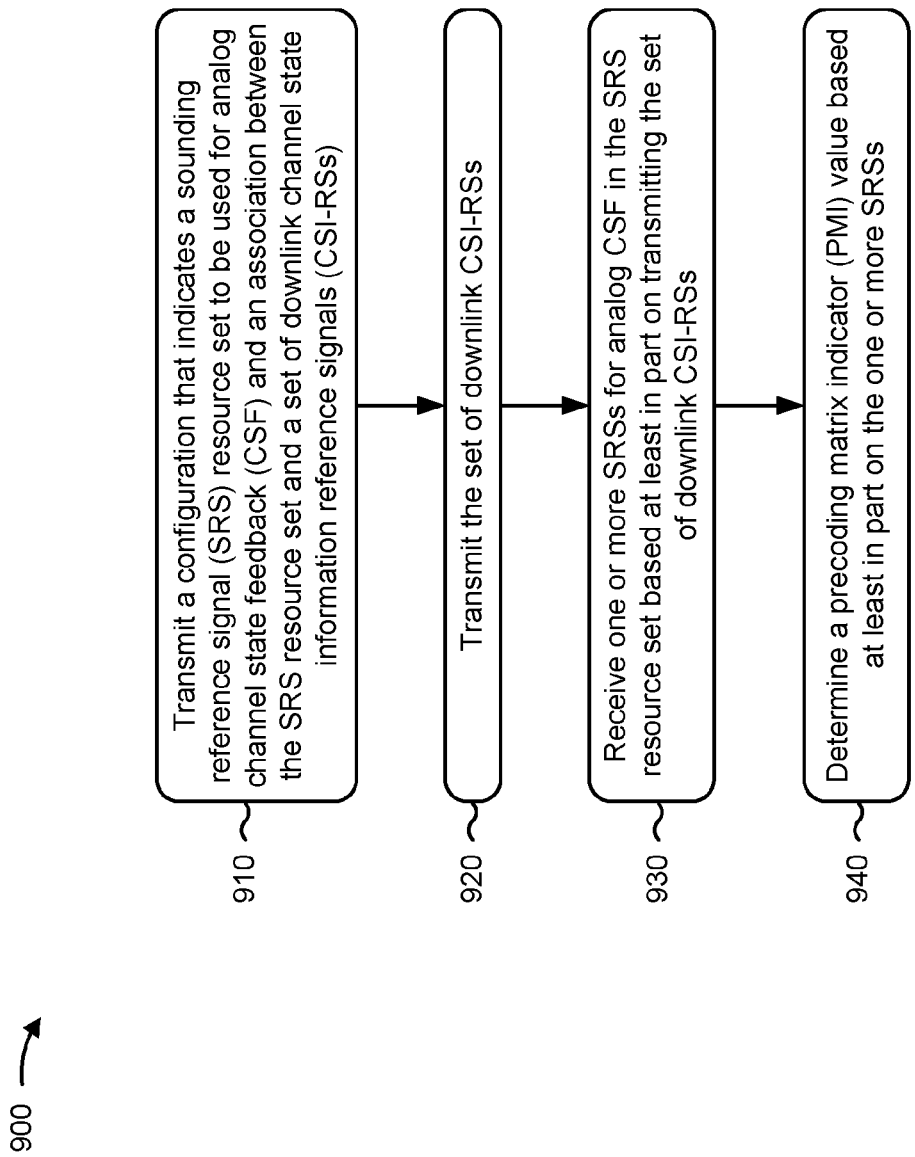

SOUNDING REFERENCE SIGNAL RESOURCE SET CONFIGURATION FOR ANALOG CHANNEL STATE FEEDBACK

CROSS-REFERENCE TO RELATED APPLICATIONS

This Patent Application is a 371 national stage of PCT Application No. PCT/CN2020/092562 filed on May 27, 2020, entitled "SOUNDING REFERENCE SIGNAL RESOURCE SET CONFIGURATION FOR ANALOG CHANNEL STATE FEEDBACK," which claims priority to Patent Cooperation Treaty (PCT) Application No. PCT/CN2019/090818, filed on Jun. 12, 2019, entitled "SOUNDING REFERENCE SIGNAL RESOURCE SET CONFIGURATION FOR ANALOG CHANNEL STATE FEEDBACK," which are hereby expressly incorporated by reference herein.

FIELD OF THE DISCLOSURE

Aspects of the present disclosure generally relate to wireless communication and to techniques and apparatuses for sounding reference signal resource set configuration for analog channel state feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving a configuration that indicates a sounding reference signal (SRS) resource set to be used for analog channel state feedback (CSF) and an association between the SRS resource set and a set of downlink channel state information reference signals (CSI-RSs); measuring the set of downlink CSI-RSs associated with the SRS resource set; and transmitting one or more SRSs for analog CSF using the SRS resource set and based at least in part on measuring the set of downlink CSI-RSs.

In some aspects, a method of wireless communication, performed by a base station, may include transmitting a configuration that indicates an SRS resource set to be used for analog CSF and an association between the SRS resource set and a set of downlink CSI-RSs; transmitting the set of downlink CSI-RSs; receiving one or more SRSs for analog CSF in the SRS resource set based at least in part on transmitting the set of downlink CSI-RSs; and determining a precoding matrix indicator (PMI) value based at least in part on the one or more SRSs.

In some aspects, a UE for wireless communication may include memory and one or more processors operatively coupled to the memory. The memory and the one or more processors may be configured to receive a configuration that indicates an SRS resource set to be used for analog CSF and an association between the SRS resource set and a set of downlink CSI-RSs; measure the set of downlink CSI-RSs associated with the SRS resource set; and transmit one or more SRSs for analog CSF using the SRS resource set and based at least in part on measuring the set of downlink CSI-RSs.

In some aspects, a base station for wireless communication may include memory and one or more processors operatively coupled to the memory. The memory and the one or more processors may be configured to transmit a configuration that indicates an SRS resource set to be used for analog CSF and an association between the SRS resource set and a set of downlink CSI-RSs; transmit the set of downlink CSI-RSs; receive one or more SRSs for analog CSF in the SRS resource set based at least in part on transmitting the set of downlink CSI-RSs; and determine a PMI value based at least in part on the one or more SRSs.

In some aspects, a non-transitory computer-readable medium may store one or more instructions for wireless communication. The one or more instructions, when executed by one or more processors of a UE, may cause the one or more processors to: receive a configuration that indicates an SRS resource set to be used for analog CSF and an association between the SRS resource set and a set of downlink CSI-RSs; measure the set of downlink CSI-RSs associated with the SRS resource set; and transmit one or more SRSs for analog CSF using the SRS resource set and based at least in part on measuring the set of downlink CSI-RSs.

In some aspects, a non-transitory computer-readable medium may store one or more instructions for wireless communication. The one or more instructions, when executed by one or more processors of a base station, may cause the one or more processors to: transmit a configuration that indicates an SRS resource set to be used for analog CSF and an association between the SRS resource set and a set of downlink CSI-RSs; transmit the set of downlink CSI-RSs; receive one or more SRSs for analog CSF in the SRS resource set based at least in part on transmitting the set of downlink CSI-RSs; and determine a PMI value based at least in part on the one or more SRSs.

In some aspects, an apparatus for wireless communication may include means for receiving a configuration that indicates an SRS resource set to be used for analog CSF and an association between the SRS resource set and a set of downlink CSI-RSs; means for measuring the set of downlink CSI-RSs associated with the SRS resource set; and means for transmitting one or more SRSs for analog CSF using the SRS resource set and based at least in part on measuring the set of downlink CSI-RSs.

In some aspects, an apparatus for wireless communication may include means for transmitting a configuration that indicates an SRS resource set to be used for analog CSF and an association between the SRS resource set and a set of downlink CSI-RSs; means for transmitting the set of downlink CSI-RSs; means for receiving one or more SRSs for analog CSF in the SRS resource set based at least in part on transmitting the set of downlink CSI-RSs; and means for determining a PMI value based at least in part on the one or more SRSs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-7 are diagrams illustrating examples of sounding reference signal resource set configuration for analog channel state feedback, in accordance with various aspects of the present disclosure.

FIGS. 8 and 9 are diagrams illustrating example processes relating to sounding reference signal resource set configuration for analog channel state feedback, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
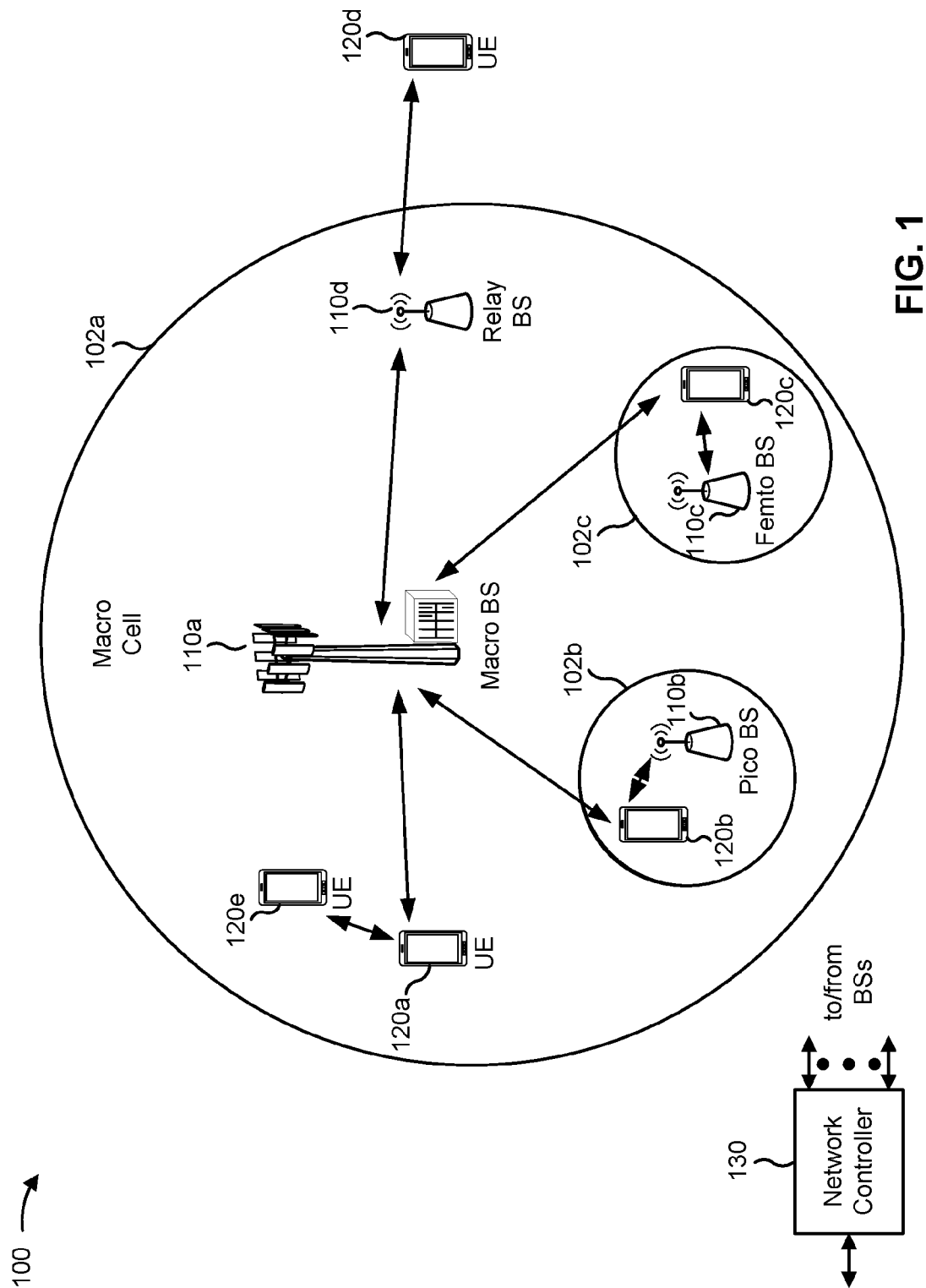
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
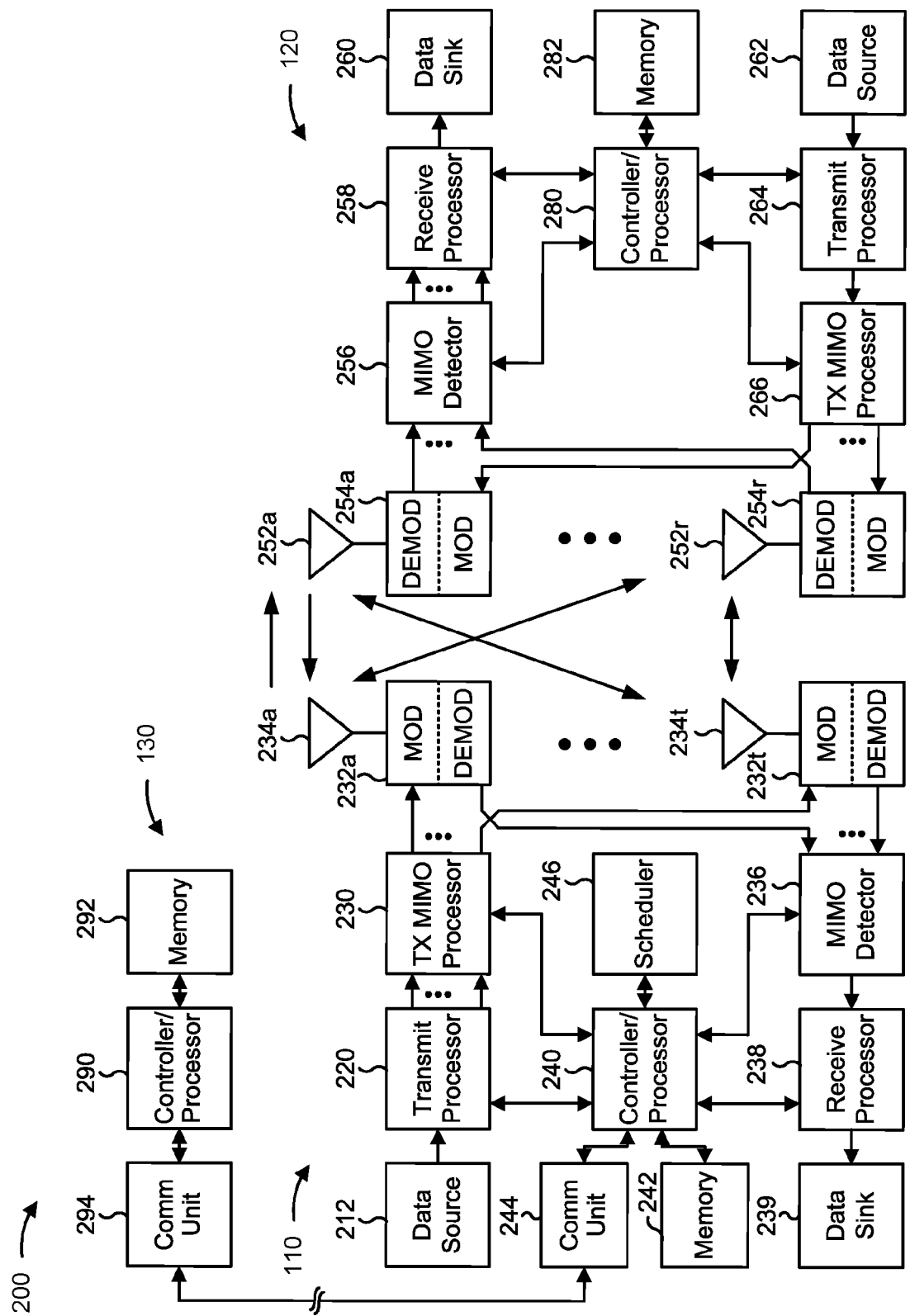
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sounding reference signal resource set configuration for analog channel state feedback, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration that indicates an SRS resource set to be used for analog CSF and an association between the SRS resource set and a set of downlink CSI-RSs; means for measuring the set of downlink CSI-RSs associated with the SRS resource set; means for transmitting one or more SRSs for analog CSF using the SRS resource set and based at least in part on measuring the set of downlink CSI-RSs; and/or the like. In some aspects, such means may include one or more components of UE 120 described in connection with FIG. 2.

In some aspects, base station 110 may include means for transmitting a configuration that indicates an SRS resource set to be used for analog CSF and an association between the SRS resource set and a set of downlink CSI-RSs; means for transmitting the set of downlink CSI-RSs; means for receiving one or more SRSs for analog CSF in the SRS resource set based at least in part on transmitting the set of downlink CSI-RSs; means for determining a PMI value based at least in part on the one or more SRSs; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
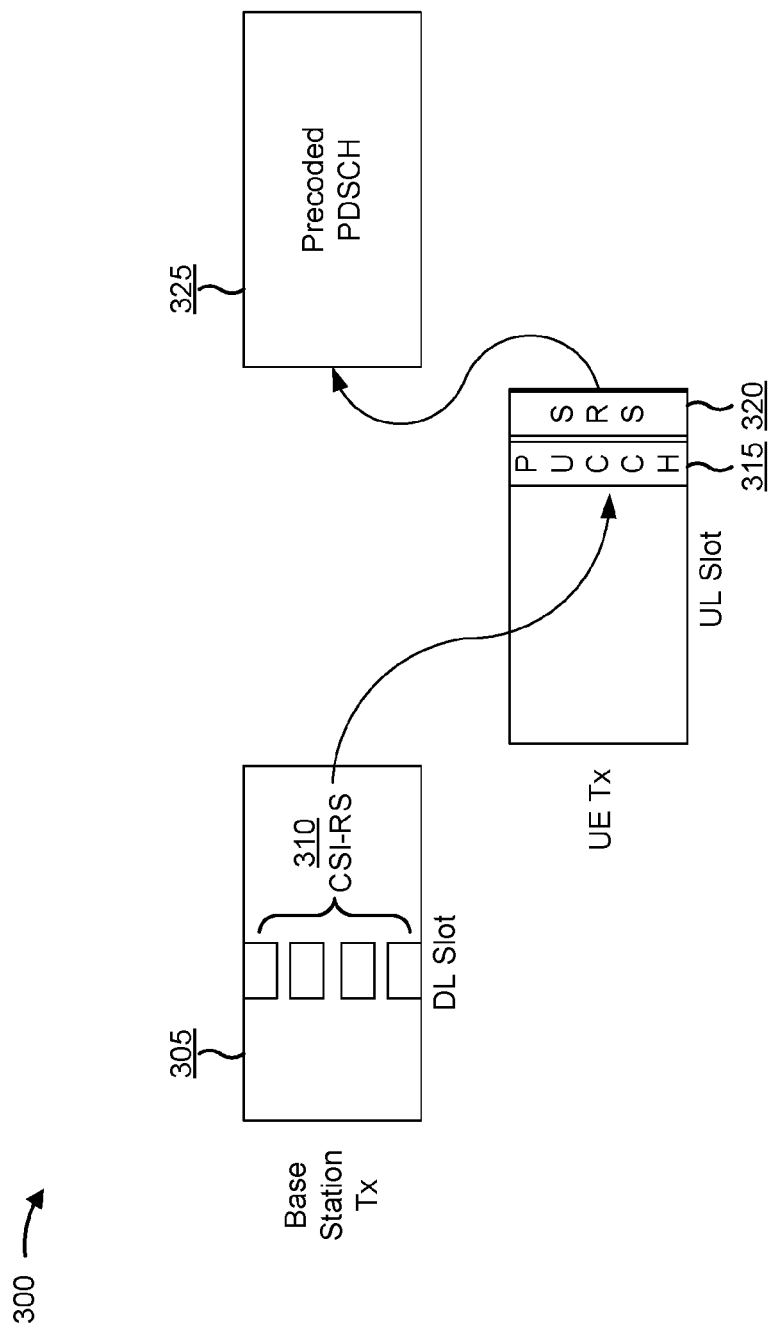
FIG. 3 is a diagram illustrating an example of a channel state feedback mechanism that supports hybrid channel state feedback, in accordance with various aspects of the present disclosure.

FIG. 3 is a diagram illustrating an example 300 of a channel state feedback mechanism that supports hybrid channel state feedback, in accordance with various aspects of the present disclosure.

As shown by reference number 305, a base station may transmit a set of downlink reference signals, shown as a set of channel state information reference signals (CSI-RSs) 310, in a downlink slot. A UE may receive and measure the set of CSI-RSs 310 to determine a transmission rank and/or a channel quality. For example, the UE may perform channel estimation (e.g., H*B) across precoded CSI-RS ports to determine a rank indicator (RI) value and/or a channel quality indicator (QCI) value. For channel estimation, H indicates the downlink channel and B indicates the precoder used for downlink CSI-RS(s). Thus, H*B may represent a channel estimate measured from the precoded CSI-RS port(s).

The UE may transmit an indication of the RI value and/or the CQI value on an uplink control channel 315, shown as a physical uplink control channel (PUCCH). In some cases, the UE may use the channel estimate H*B to determine a singular value decomposition (SVD) of a precoded channel. For example, the UE may calculate an eigenvector corresponding to the SVD of a matrix combination corresponding to the channel estimate H*B. In some aspects, the UE may calculate eigenvectors and a precoding matrix indicator (PMI) from the channel estimate. For example, the UE may determine a right eigenvector D, a left eigenvector U (sometimes referred to as a spatial domain transmission filter U), and a PMI V based at least in part on the channel estimate. The PMI may correspond to the RI value and the CQI value determined by the UE. The UE may indicate the RI value and the CQI value in the uplink control channel 315 (e.g., the PUCCH), and may indicate the calculated PMI V using one or more sounding reference signals (SRSs) 320.

In some aspects, the UE may transmit one or more SRSs 320 that indicate a precoding matrix associated with the determined RI and CQI. For example, the UE may precode an SRS using the left eigenvector U (e.g., a linear receiver, a spatial domain transmission filter, and/or the like). The base station may use the left eigenvector U to derive and/or estimate the precoder V (e.g., the PMI V) corresponding to the RI value and/or the CQI value. As shown by reference number 325, the base station may use the estimated precoder (e.g., beam) to transmit a data communication to the UE, such as a physical downlink shared channel (PDSCH) communication.

In NR, a base station may configure a UE with a usage (e.g., an SRS usage) for an SRS resource set. For example, an SRS resource set may be configured with a beam management usage, a codebook usage, a non-codebook usage, or an antenna switching usage. The UE may transmit SRSs for a usage using the SRS resource set configured for that usage.

A beam management SRS resource set may be used for indicating CSI for millimeter wave communications. For example, a beam management SRS resource set may be used for beam-sweeping SRS. In this case, the UE may use different transmit beams for transmission of SRSs on different SRS resources. The base station may use the SRSs received on different beams to measure beam parameters of the beams.

A codebook SRS resource set may be used to indicate uplink CSI (e.g., an SRS resource indicator (SRI), a transmit rank indicator (TRI), a transmit precoder matrix indicator (TPMI), and/or the like) when a base station indicates an uplink precoder to the UE. For example, when the base station is configured to indicate an uplink precoder to the UE (e.g., using a precoder codebook), the base station may use a codebook SRS (e.g., an SRS transmitted using a resource of a codebook SRS resource set) to acquire uplink CSI.

A non-codebook SRS resource set may be used to indicate uplink CSI when the UE selects an uplink precoder (e.g., instead of the base station indicating an uplink precoder to be used by the UE). For example, when the UE is configured to select an uplink precoder, the base station may use a non-codebook SRS (e.g., an SRS transmitted using a resource of a non-codebook SRS resource set) to acquire uplink CSI. In this case, the non-codebook SRS may be precoded using a precoder selected by the UE (e.g., which may be indicated to the base station). The base station may use the non-codebook SRS resource set to estimate an uplink channel.

An antenna switching SRS resource set may be used to indicate downlink channel state information (CSI) with reciprocity between an uplink and downlink channel. For example, when there is reciprocity between an uplink channel and a downlink channel, a base station may use an antenna switching SRS (e.g., an SRS transmitted using a resource of an antenna switching SRS resource set) to acquire downlink CSI (e.g., to determine a downlink precoder to be used to communicate with the UE, to estimate a downlink channel, and/or the like).

When a UE reports hybrid analog channel state feedback (CSF) (sometimes referred to as analog CSF), as described above in connection with FIG. 3, the UE reports an RI value and/or a CQI value in a PUCCH communication, and the UE precodes SRS(s) using a precoder matrix U (e.g., a left eigenvector, a spatial domain transmission filter, and/or the like). Because the precoder matrix U is determined from a set of downlink CSI-RSs received from the base station, the UE should be configured with an association between the SRS resource set to be used to transmit SRS(s) precoded using the precoder matrix U (e.g., SRS(s) for reporting analog CSF) and the set of downlink CSI-RSs to be used to determine the precoder matrix U. With this configuration, the UE can determine the precoder matrix U from the associated set of downlink CSI-RSs and can use the precoder matrix U to precode the SRS(s) transmitted on the SRS resource set, and the base station can properly derive the PMI from the precoded SRS(s).

However, none of the SRS resource set usages of beam management, codebook, non-codebook, and antenna switching permit indication of an association between downlink CSI-RS(s) and an SRS resource set to be used for downlink CSI acquisition (e.g., for the base station to determine a precoder for a PDSCH communication). For example, the antenna switching usage is not tied to downlink CSI-RS(s) because there is no dependency between transmission of antenna switching SRS and downlink CSI-RS(s). The codebook usage is also not tied to downlink CSI-RS(s), and is used for uplink CSI acquisition rather than downlink CSI acquisition. The non-codebook usage is tied to downlink CSI-RS(s), but is also used for uplink CSI acquisition. The beam management usage is also tied to downlink CSI-RS(s), but is used for uplink beam-sweeping of SRS. Thus, no mechanism exists to tie downlink CSI-RS(s) to an SRS resource set to be used for downlink CSI acquisition, such as for reporting analog CSF.

Some techniques and apparatuses described herein permit a UE to be configured with an SRS resource set for analog CSF, such as by indicating an association between such an SRS resource set and a set of downlink CSI-RSs (e.g., one or more downlink CSI-RSs) to be used to derive a precoder (e.g., a left eigenvector U, sometimes referred to as a spatial domain transmission filter) to be used to precode SRS(s) transmitted in the SRS resource set. In this way, the UE may use analog CSF reporting techniques to indicate downlink CSI to a base station, which may use less signaling overhead than other CSI reporting techniques.

As indicated above, FIG. 3 is provided as an example. Other examples may differ from what is described with respect to FIG. 3.

Figure 4:
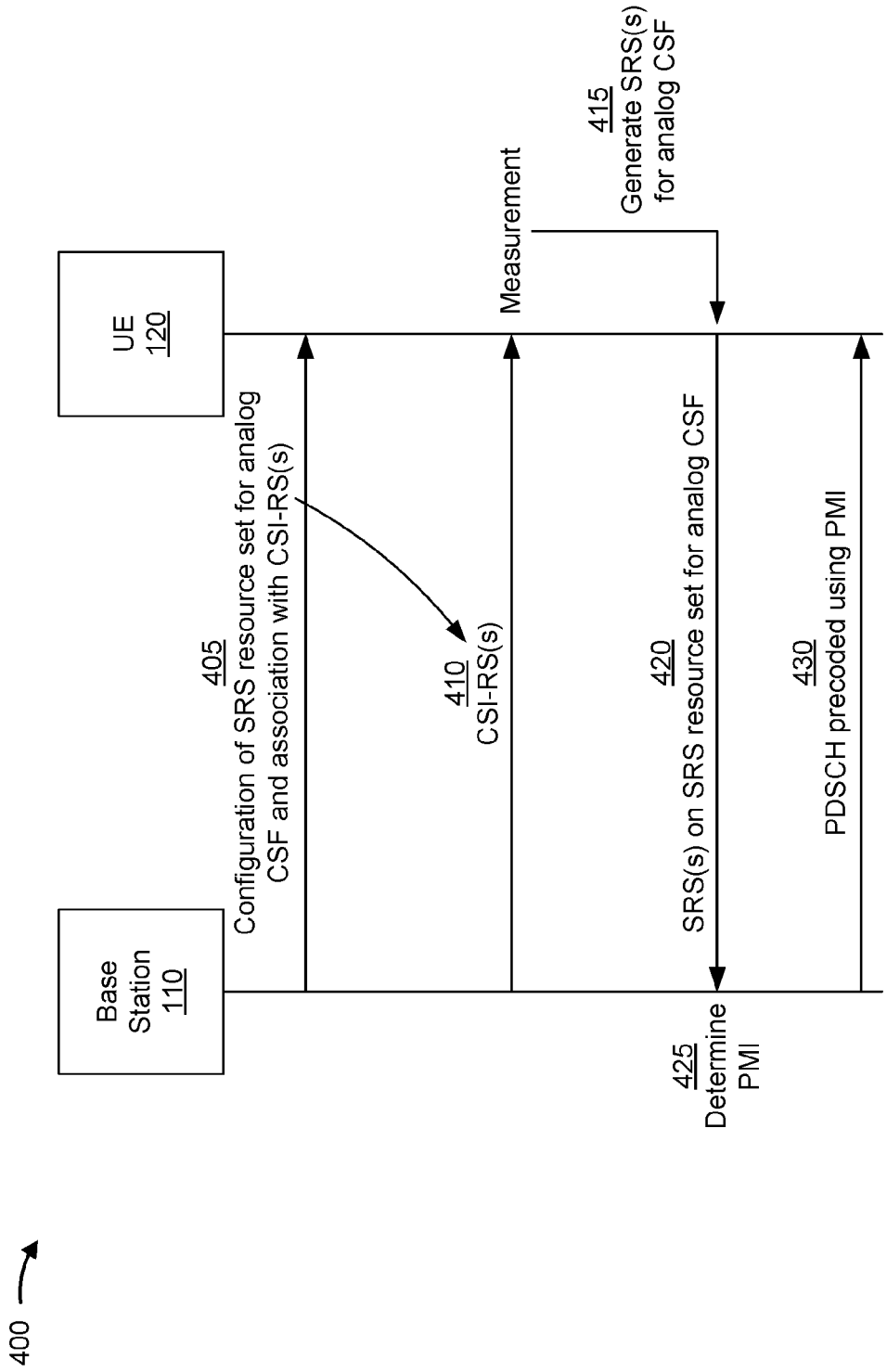

FIG. 4 is a diagram illustrating an example 400 of sounding reference signal resource set configuration for analog channel state feedback, in accordance with various aspects of the present disclosure. As shown in FIG. 4, a base station 110 and a UE 120 may communicate with one another.

As shown by reference number 405, the base station 110 may transmit, and the UE 120 may receive, a configuration (e.g., an SRS configuration) that indicates an SRS resource set to be used for analog CSF and an association between the SRS resource set and a set of downlink CSI-RSs. The SRS resource set may include one or more time domain resources (e.g., one or more symbols), one or more frequency domain resources (e.g., one or more resource blocks), one or more SRS ports, and/or the like, to be used by the UE 120 to transmit SRS(s) precoded using a precoder (e.g., a left eigenvector U or spatial domain transmission filter U) derived from measurements of the set of downlink CSI-RSs. In some aspects, the configuration may be transmitted in a radio resource control (RRC) message, such as an RRC configuration message, an RRC reconfiguration message, and/or the like.

In some aspects, the SRS resource set is indicated using an analog CSF SRS usage that is different from a beam management SRS usage, a codebook SRS usage, a non-codebook SRS usage, and an antenna switching SRS usage, as described in more detail below in connection with FIG. 5. In some aspects, the SRS resource set is indicated using an antenna switching SRS usage for the SRS resource set, as described in more detail below in connection with FIG. 7.

The set of downlink CSI-RSs, sometimes referred to as a set of CSI-RSs, may include one or more CSI-RSs. In some aspects, the set of CSI-RSs may include only a single CSI-RS in a time division duplexing (TDD) system. Alternatively, the set of CSI-RSs may include at least two CSI-RSs in a frequency division duplexing (FDD) system. The configuration may identify one or more time domain resources (e.g., one or more symbols), one or more frequency domain resources (e.g., one or more resource blocks), one or more ports, and/or the like, in which the set of CSI-RSs are to be transmitted by the base station 110 and received by the UE 120. In some aspects, one or more of these parameters may be indicated in the configuration using, for example, a CSI-RS index. In some aspects, an association between the SRS resource set and the set of downlink CSI-RSs is indicated using a CSI-RS parameter in an SRS resource set field of the configuration, an associated CSI-RS parameter in the SRS resource set field of the configuration, or a spatial relation information parameter in the SRS resource set field of the configuration, as described in more detail below in connection with FIG. 6.

As shown by reference number 410, the base station 110 may transmit the set of CSI-RSs associated with the SRS resource set to be used for analog CSF. The base station 110 may transmit the set of CSI-RSs according to the configuration. For example, the base station 110 may transmit the set of CSI-RSs in one or more time domain resources, in one or more frequency domain resources, using one or more ports, and/or the like, as indicated in the configuration. The UE 120 may monitor for, receive, and/or measure the CSI-RSs according to the configuration (e.g., in the one or more time domain resources, in one or more frequency domain resources, using one or more ports, and/or the like).

As shown by reference number 415, the UE 120 may generate one or more SRSs for analog CSF based at least in part on measuring the set of CSI-RSs. For example, based at least in part on measuring the set of CSI-RSs, the UE 120 may determine a precoder (e.g., a left eigenvector U, a spatial domain transmission filter U, and/or the like), as described above in connection with FIG. 3. Additionally, or alternatively, the UE 120 may determine an RI value and/or a CQI value based at least in part on measuring the set of CSI-RSs and may indicate the RI value and/or the CQI value to the base station 110 in a PUCCH communication, as described above in connection with FIG. 3.

As shown by reference number 420, the UE 120 may transmit the one or more SRSs for analog CSF using the SRS resource set indicated in the configuration. The UE 120 may transmit the one or more SRSs according to the configuration. For example, the UE 120 may transmit the one or more SRSs in one or more time domain resources included in the configured SRS resource set, in one or more frequency domain resources included in the configured SRS resource set, using one or more ports indicated by the configuration for the SRS resource set, and/or the like. The base station 110 may monitor for, receive, and/or measure the one or more SRSs according to the configuration (e.g., in the one or more time domain resources, in one or more frequency domain resources, using one or more ports, and/or the like).

The UE 120 may transmit SRSs for analog CSF using multiple SRS ports (e.g., according to the configuration). In some aspects, when the UE 120 transmits the SRSs using multiple SRS ports, the UE 120 may use a same transmit power for each of the SRS ports (e.g., may use a same transmit power to transmit each SRS, where each SRS is transmitted on a different configured SRS port). Alternatively, the UE 120 may use different transmit powers for different SRS ports (e.g., may use a different transmit power to transmit different SRSs on different SRS ports). For example, the UE 120 may modify and/or scale a transmit power for an SRS port based at least in part on a set of singular values of measurement (e.g., a set of SVD values, as described above in connection with FIG. 3) determined based at least in part on measuring the set of CSI-RSs. For example, the UE 120 may increase a transmit power for an SRS transmitted using a weaker precoder (e.g., a weaker left eigenvector U) relative to a transmit power used for an SRS transmitted using a stronger precoder. Similarly, the UE 120 may decrease a transmit power for an SRS transmitted using a stronger precoder relative to a transmit power used for an SRS transmitted using a weaker precoder.

As an example, the UE 120 may be configured with two SRS ports, and may determine two precoders (e.g., two left eigenvectors U) for transmission of respective SRSs on those two SRS ports (e.g., the two strongest precoders). The UE 120 may determine a first singular value of measurement $S_1$ for the stronger precoder of the two precoders, and may determine a second singular value of measurement $S_2$ for the weaker precoder of the two precoders. Based at least in part on these determinations, the UE 120 may increase the transmit power for the SRS transmitted using the weaker precoder based at least in part on the values of $S_1$ and $S_2$. For example, the UE 120 may scale up the transmit power for the SRS transmitted using the weaker precoder by a factor of $S_1^2$ divided by $S_2^2 (S_1^2/S_2^2)$.

As another example, the UE 120 may be configured with three SRS ports, and may determine three precoders (e.g., three left eigenvectors U) for transmission of respective SRSs on those three SRS ports (e.g., the three strongest precoders). The UE 120 may determine a first singular value of measurement $S_1$ for the strongest precoder of the three precoders, may determine a second singular value of measurement $S_2$ for the second-strongest precoder of the three precoders, and may determine a third singular value of measurement $S_3$ for the weakest precoder of the three precoders. Based at least in part on these determinations, the UE 120 may modify and/or scale the transmit powers for the SRSs based at least in part on the values of $S_1$, $S_2$, and/or $S_3$. For example, the UE 120 may scale up the transmit power for the SRS transmitted using the second-strongest precoder by a factor of $S_1^2$ divided by $S_2^2$ ($S_1^2/S_2^2$). Additionally, or alternatively, the UE 120 may scale up the transmit power for the SRS transmitted using the weakest precoder by a factor of $S_1^2$ divided by $S_3^2$ ($S_1^2/S_3^2$).

As another example, the UE 120 may be configured with four SRS ports, and may determine four precoders (e.g., four left eigenvectors U) for transmission of respective SRSs on those four SRS ports (e.g., the four strongest precoders). The UE 120 may determine a first singular value of measurement $S_1$ for the strongest precoder of the four precoders, may determine a second singular value of measurement $S_2$ for the second-strongest precoder of the four precoders, may determine a third singular value of measurement $S_3$ for the third-strongest precoder of the four precoders, and may determine a fourth singular value of measurement $S_4$ for the weakest precoder of the four precoders. Based at least in part on these determinations, the UE 120 may modify and/or scale the transmit powers for the SRSs based at least in part on the values of $S_1$, $S_1$, $S_3$, and/or $S_4$. For example, the UE 120 may scale up the transmit power for the SRS transmitted using the second-strongest precoder by a factor of $S_1^2$ divided by $S_2^2$ ($S_1^2/S_2^2$). Additionally, or alternatively, the UE 120 may scale up the transmit power for the SRS transmitted using the third-strongest precoder by a factor of $S_1^2$ divided by $S_3^2$ ($S_1^2/S_3^2$). Additionally, or alternatively, the UE 120 may scale up the transmit power for the SRS transmitted using the weakest precoder by a factor of $S_1^2$ divided by $S_4^2$ ($S_1^2/S_4^2$).

In this way, the UE 120 may increase the likelihood of detection, by the base station 110, of SRS transmissions that use weaker precoders (e.g., weaker beams). As used herein, a weaker precoder or a weaker beam may refer to a precoder or beam that has less desirable beam parameter(s) as compared to a stronger precoder or a stronger beam, such as a lower rank (e.g., RI value), a lower quality (e.g., CQI value), and/or the like.

As shown by reference number 425, the base station 110 may determine a precoding matrix indicator (PMI) value based at least in part on the one or more SRSs. For example, the base station 110 may use the left eigenvector U (e.g., used to precode the one or more SRSs) to derive and/or estimate the PMI, as described above in connection with FIG. 3. In some aspects, the base station 110 may use the SRS precoder (e.g., the left eigenvector U), an RI value (e.g., received in a PUCCH communication), and/or a CQI value (e.g., received in a PUCCH communication) to determine the PMI.

As shown by reference number 430, the base station 110 may use the PMI to precode one or more PDSCH communications, and may transmit the one or more PDSCH communications to the UE 120. The UE 120 may receive the precoded PDSCH communication(s) according to a PMI determined based at least in part on measuring the set of CSI-RSs (and indicated to the base station 110 using the left eigenvector U, the RI value, and the CQI value).

In this way, the base station 110 may estimate the PMI using analog CSF, which has less signaling overhead than other CSI reporting techniques that include an explicit indication of the PMI. This estimation is permitted due to configuration of an SRS resource set used for analog CSF and an association between that SRS resource set and the set of CSI-RSs to be used to generate SRS(s) transmitted using that SRS resource set. Because this association is configured and therefore known by both the base station 110 and the UE 120, ambiguities can be reduced or eliminated that would otherwise lead to a poor estimation of the PMI if the base station 110 and the UE 120 assumed different associations between an SRS resource set used for analog CSF and a corresponding set of CSI-RSs used to generate SRS transmitted in that SRS resource set.

As indicated above, FIG. 4 is provided as an example. Other examples may differ from what is described with respect to FIG. 4.

FIG. 5 is a diagram illustrating another example 500 of sounding reference signal resource set configuration for analog channel state feedback, in accordance with various aspects of the present disclosure.

As described above in connection with FIG. 4, a base station 110 may transmit, and a UE 120 may receive, a configuration (e.g., an SRS configuration) that indicates an SRS resource set to be used for analog CSF and an association between the SRS resource set and a set of downlink CSI-RSs. In some aspects, the base station 110 may indicate the SRS resource set using an analog CSF SRS usage that is different from a beam management SRS usage, a codebook SRS usage, a non-codebook SRS usage, and an antenna switching SRS usage.

For example, as shown in FIG. 5, the base station 110 may indicate an analog CSF usage 505 (shown as analogCsf) in an enumerated set of usages 510 for a usage parameter 515 included in an SRS resource set field 520 (shown as SRS-ResourceSet). As shown, the analog CSF usage 505 is included in the enumerated set of usages 510 in addition to a beam management usage (shown as beamManagment), a codebook usage (shown as codebook), a non-codebook usage (shown as nonCodebook), and an antenna switching usage (shown as antennaSwitching), and the analog CSF usage 505 is different from these usages. As shown by reference number 525, an SRS resource set with an analog CSF usage 505 may be configured as an aperiodic SRS resource set, a semi-persistent SRS resource set, or a periodic SRS resource set.

In some aspects, the UE 120 may be configured with a single SRS resource set for the analog CSF usage. In this case, all SRS resources included in the SRS resource set (e.g., all time domain resources, frequency domain resources, SRS ports, and/or the like) may be associated with the same set of CSI-RSs. Alternatively, the UE 120 may be configured with multiple SRS resource sets for the analog CSF usage. Different SRS resource sets may be configured with different time domain resources, different frequency domain resources, different SRS ports, and/or associations with different sets of CSI-RS(s). For example, a first SRS resource set with the analog CSF usage may be associated with a first set of CSI-RS(s), and a second SRS resource set with the analog CSF usage may be associated with a second, different set of CSI-RS(s). However, in some aspects, different SRS resource sets may be associated with the same set of CSI-RS(s). For example, a set of CSI-RS(s) associated with an SRS resource set may be configured using a resource identifier for a set of CSI-RS(s) (shown as non-zero power (NZP) CSI-RS(s)), as shown by reference number 530. Additional details are described below in connection with FIG. 6.

As indicated above, FIG. 5 is provided as an example. Other examples may differ from what is described with respect to FIG. 5.

Figure 6:
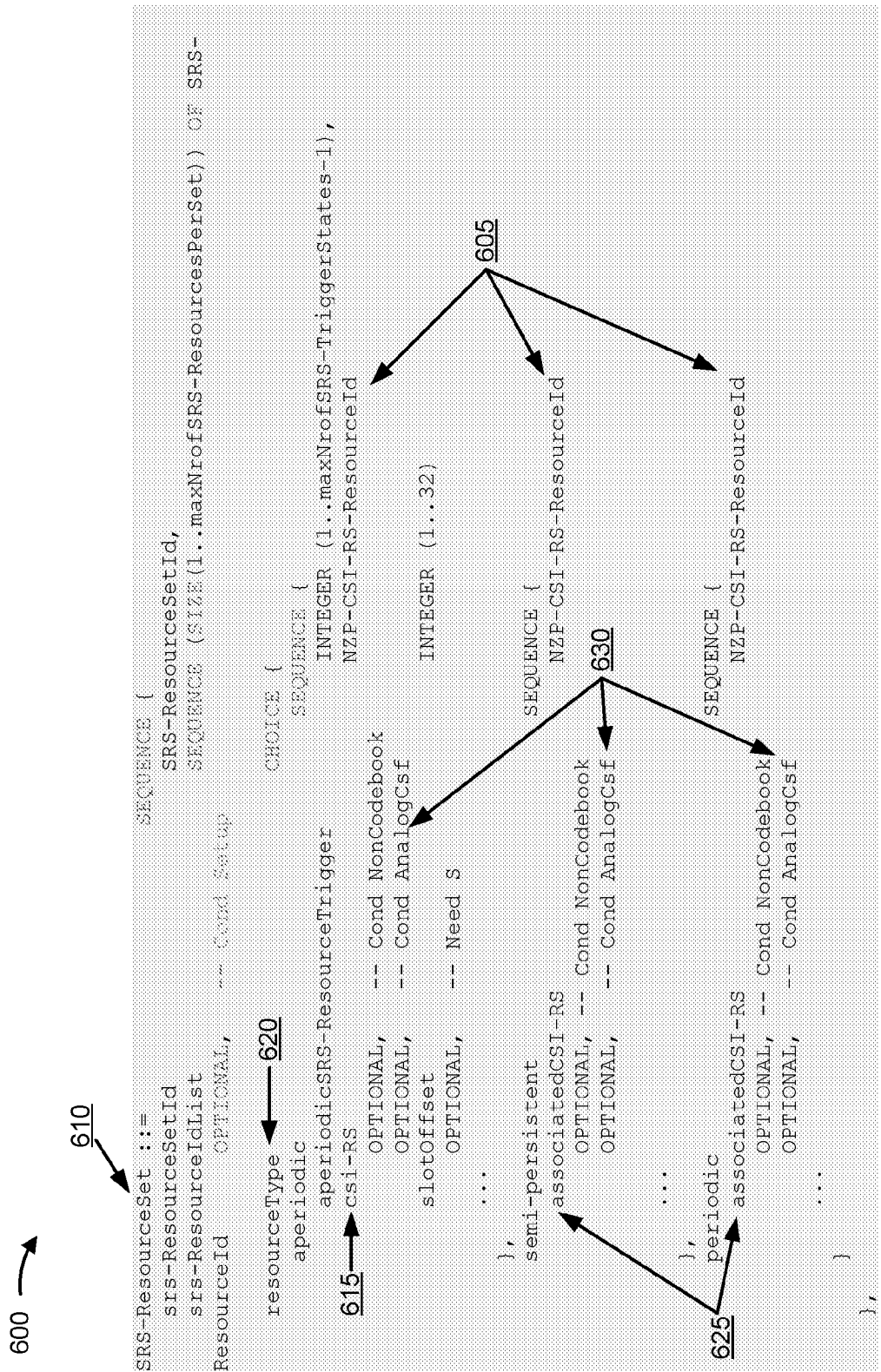

FIG. 6 is a diagram illustrating another example 600 of sounding reference signal resource set configuration for analog channel state feedback, in accordance with various aspects of the present disclosure.

As described above in connection with FIG. 4, a base station 110 may transmit, and a UE 120 may receive, a configuration (e.g., an SRS configuration) that indicates an SRS resource set to be used for analog CSF and an association between the SRS resource set and a set of downlink CSI-RSs. In some aspects, the base station 110 may indicate the association using a CSI-RS parameter in an SRS resource set field of the configuration, an associated CSI-RS parameter in the SRS resource set field of the configuration, a spatial relation information parameter in the SRS resource set field of the configuration, and/or the like.

For example, as shown in FIG. 6, the base station 110 may indicate a CSI-RS resource identifier 605 (shown as NZP-CSI-RS-ResourceId) in an SRS resource set field 610 for an SRS resource set having an analog CSF usage (e.g., which may be indicated as described above in connection with FIG. 5). In some aspects, the CSI-RS resource identifier 605 may identify a set of CSI-RS(s), which may be a set of non-zero power (NZP) CSI-RS(s). For example, the CSI-RS resource identifier 605 may indicate one or more time domain resources, one or more frequency domain resources, one or more ports, and/or the like, for transmission of the set of NZP CSI-RS(s).

In some aspects, the association between an SRS resource set configured with an analog CSF usage and the corresponding set of CSI-RS(s) may be indicated using a CSI-RS parameter 615 (shown as csi-RS) in the SRS resource set field 610. For example, the CSI-RS parameter 615 may be used to configure an association between a set of CSI-RS(s) and an aperiodic SRS resource set, such as an SRS resource set having a resource type 620 of aperiodic. Additionally, or alternatively, the association between an SRS resource set configured with an analog CSF usage and the corresponding set of CSI-RS(s) may be indicated using an associated CSI-RS parameter 625 (shown as associatedCSI-RS) in the SRS resource set field 610. For example, the associated CSI-RS parameter 625 may be used to configure an association between a set of CSI-RS(s) and a periodic SRS resource set and/or a semi-persistent SRS resource set, such as an SRS resource set having a resource type 620 of periodic or semi-persistent. As shown, in some aspects, the association may be indicated by including an optional analog CSF SRS usage parameter 630 (shown as Cond AnalogCsf) in association with the CSI-RS resource identifier 605 and/or in association with the CSI-RS parameter 615 or the associated CSI-RS parameter 625.

Alternatively, the association between an SRS resource set configured with an analog CSF usage and the corresponding set of CSI-RS(s) may be indicated using a spatial relation information parameter (e.g., spatialRelationInfo, not shown) in the SRS resource set field 610. For example, the spatial relation information parameter may include a CSI-RS index value (e.g., csi-RS-Index, not shown) that identifies the set of CSI-RS(s). The UE 120 may use a spatial domain transmission filter (e.g., U) to receive the set of CSI-RS(s) (e.g., periodic CSI-RS(s), semi-persistent CSI-RS(s), and/or the like), and may transmit SRS(s) in the SRS resource set using the same spatial domain transmission filter. In this way, the spatial relationship information parameter, typically used for a beam management usage, can be reused for the analog CSF usage.

As indicated above, FIG. 6 is provided as an example. Other examples may differ from what is described with respect to FIG. 6.

Figure 7:
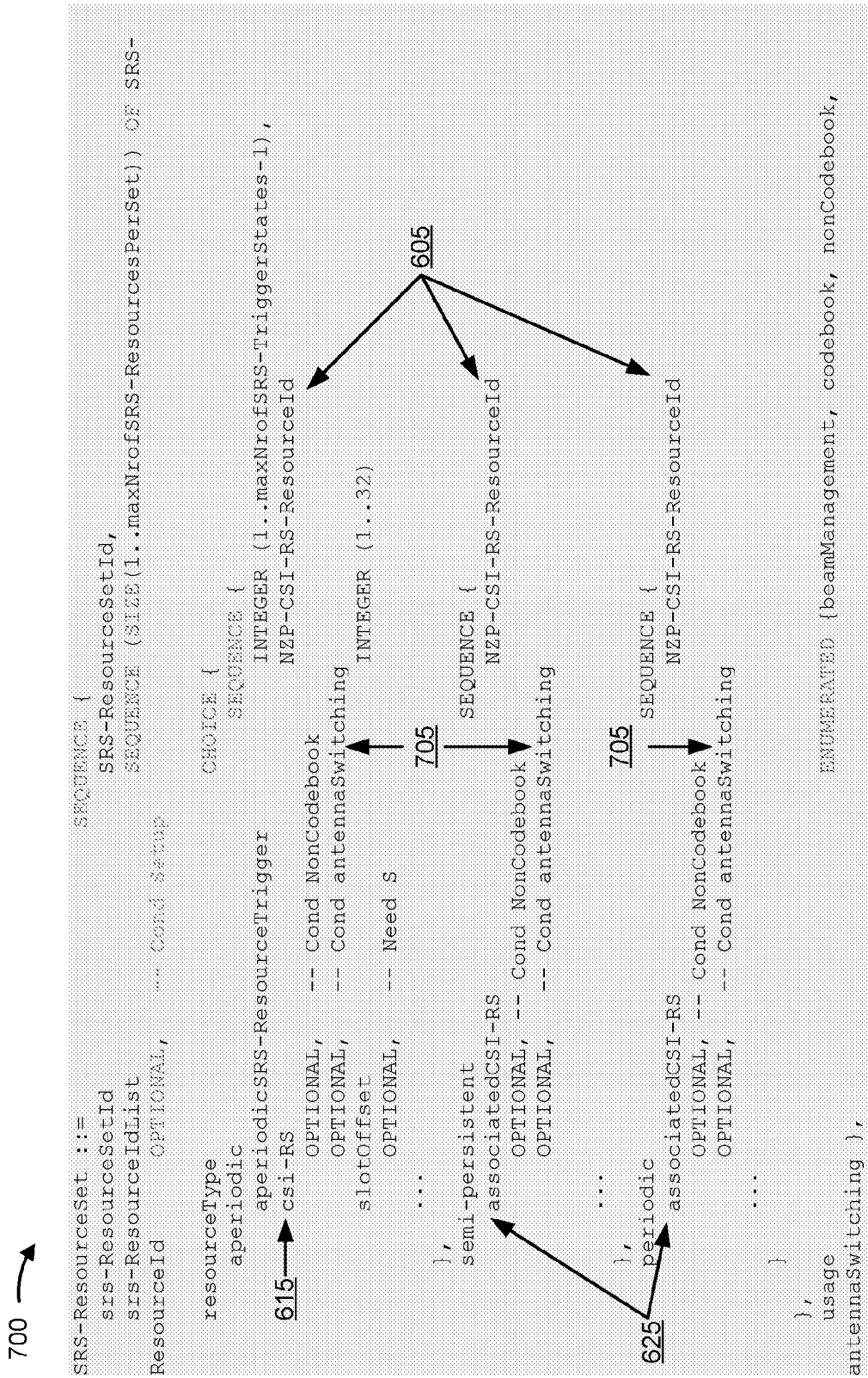

FIG. 7 is a diagram illustrating another example 700 of sounding reference signal resource set configuration for analog channel state feedback, in accordance with various aspects of the present disclosure.

As described above in connection with FIG. 4, a base station 110 may transmit, and a UE 120 may receive, a configuration (e.g., an SRS configuration) that indicates an SRS resource set to be used for analog CSF and an association between the SRS resource set and a set of downlink CSI-RSs. In some aspects, the base station 110 may indicate the SRS resource set using an antenna switching SRS usage for the SRS resource set. For example, rather than specifying or enumerating a separate SRS usage specific to analog CSF (e.g., an enumerated analog CSF usage, as described above in connection with FIG. 5), the configuration may reuse an existing SRS usage, such as an antenna switching usage, to indicate an SRS resource set for analog CSF.

For example, as shown in FIG. 7, the base station 110 may indicate an optional antenna switching SRS usage parameter 705 (shown as Cond antennaSwitching) in association with a CSI-RS resource identifier 605 and/or in association with a CSI-RS parameter 615 or an associated CSI-RS parameter 625. The CSI-RS resource identifier 605, the CSI-RS parameter 615, and the associated CSI-RS parameter 625 are described in more detail above in connection with FIG. 6. Normally, the antenna switching usage is not tied to downlink CSI-RS(s) because there is no dependency between transmission of antenna switching SRS and downlink CSI-RS(s). Thus, if the base station 110 indicates an association between downlink CSI-RS(s) and an SRS resource set with an indicated usage of antenna switching (e.g., when the antenna switching SRS usage parameter 705 is present in the SRS resource set configuration), then the UE 120 may use that SRS resource set for transmitting SRS(s) with analog CSF, which does have an association with downlink CSI-RS(s). If the base station 110 does not indicate an association between downlink CSI-RS(s) and an SRS resource set with an indicated usage of antenna switching (e.g., when the antenna switching SRS usage parameter 705 is absent in the SRS resource set configuration), then the UE 120 may use that SRS resource set for the antenna switching usage (and not for analog CSF). In this way, SRS for analog CSF may be supported without adding an additional enumerated usage, and with full compatibility with the antenna switching usage As indicated above, FIG. 7 is provided as an example. Other examples may differ from what is described with respect to FIG. 7.

Figure 8:
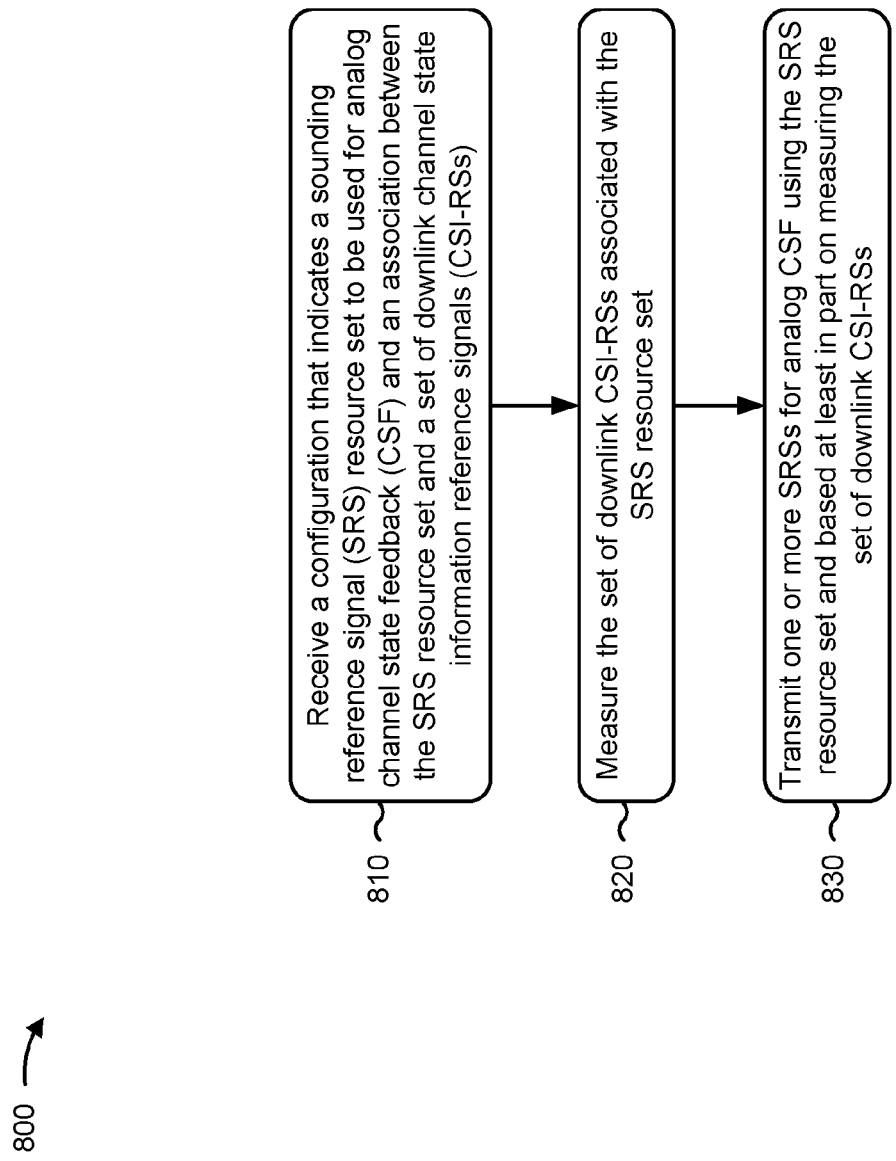

FIG. 8 is a diagram illustrating an example process 800 performed, for example, by a UE, in accordance with various aspects of the present disclosure. Example process 800 is an example where a UE (e.g., UE 120 and/or the like) performs operations associated with sounding reference signal resource set configuration for analog channel state feedback.

As shown in FIG. 8, in some aspects, process 800 may include receiving a configuration that indicates a sounding reference signal (SRS) resource set to be used for analog channel state feedback (CSF) and an association between the SRS resource set and a set of downlink channel state information reference signals (CSI-RSs) (block 810). For example, the UE (e.g., using receive processor 258, controller/processor 280, memory 282, and/or the like) may receive a configuration that indicates an SRS resource set to be used for analog CSF and an association between the SRS resource set and a set of downlink CSI-RSs, as described above.

As further shown in FIG. 8, in some aspects, process 800 may include measuring the set of downlink CSI-RSs associated with the SRS resource set (block 820). For example, the UE (e.g., using receive processor 258, controller/processor 280, memory 282, and/or the like) may measure the set of downlink CSI-RSs associated with the SRS resource set, as described above.

As further shown in FIG. 8, in some aspects, process 800 may include transmitting one or more SRSs for analog CSF using the SRS resource set and based at least in part on measuring the set of downlink CSI-RSs (block 830). For example, the UE (e.g., using transmit processor 264, controller/processor 280, memory 282, and/or the like) may transmit one or more SRSs for analog CSF using the SRS resource set and based at least in part on measuring the set of downlink CSI-RSs, as described above.

Process 800 may include additional aspects, such as any single aspect or any combination of aspects described below and/or in connection with one or more other processes described elsewhere herein.

In a first aspect, the SRS resource set is indicated using an analog CSF SRS usage that is different from a beam management SRS usage, a codebook SRS usage, a non-codebook SRS usage, and an antenna switching SRS usage.

In a second aspect, alone or in combination with the first aspect, the SRS resource set is aperiodic, periodic, or semi-persistent.

In a third aspect, alone or in combination with one or more of the first and second aspects, the set of downlink CSI-RSs is a set of non-zero power (NZP) CSI-RSs, and the one or more SRSs are transmitted using a spatial domain transmission filter determined based at least in part on measuring the set of NZP CSI-RSs.

In a fourth aspect, alone or in combination with one or more of the first through third aspects, all SRS resources included in the SRS resource set are associated with the set of downlink CSI-RSs.

In a fifth aspect, alone or in combination with one or more of the first through fourth aspects, the SRS resource set is one of multiple SRS resource sets configured to be used for analog CSF.

In a sixth aspect, alone or in combination with one or more of the first through fifth aspects, different SRS resource sets, of the multiple SRS resource sets, are associated with different sets of CSI-RSs.

In a seventh aspect, alone or in combination with one or more of the first through sixth aspects, the association is indicated using either a CSI-RS parameter or an associated CSI-RS parameter in an SRS resource set field of the configuration.

In an eighth aspect, alone or in combination with one or more of the first through seventh aspects, the association is indicated using a spatial relation information parameter in an SRS resource set field of the configuration.

In a ninth aspect, alone or in combination with one or more of the first through eighth aspects, the set of downlink CSI-RSs are identified using a CSI-RS index value of the spatial relation information parameter.

In a tenth aspect, alone or in combination with one or more of the first through ninth aspects, the SRS resource set is indicated using an antenna switching SRS usage for the SRS resource set.

In an eleventh aspect, alone or in combination with one or more of the first through tenth aspects, the SRS resource set is used for analog CSF when the antenna switching SRS usage is indicated in either a CSI-RS parameter or an associated CSI-RS parameter in a resource type field of an SRS resource set field of the configuration.

In a twelfth aspect, alone or in combination with one or more of the first through eleventh aspects, the one or more SRSs are transmitted using a same transmit power for each SRS port used to transmit the one or more SRSs.

In a thirteenth aspect, alone or in combination with one or more of the first through twelfth aspects, the one or more SRSs are transmitted using different transmit powers for different SRS ports used to transmit the one or more SRSs.

In a fourteenth aspect, alone or in combination with one or more of the first through thirteenth aspects, a transmit power for an SRS port is scaled based at least in part on a set of singular values of measurement determined based at least in part on measuring the set of downlink CSI-RSs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where a base station (e.g., base station 110 and/or the like) performs operations associated with sounding reference signal resource set configuration for analog channel state feedback.

As shown in FIG. 9, in some aspects, process 900 may include transmitting a configuration that indicates an SRS resource set to be used for analog CSF and an association between the SRS resource set and a set of downlink CSI-RSs (block 910). For example, the base station (e.g., using transmit processor 220, controller/processor 240, memory 242, and/or the like) may transmit a configuration that indicates an SRS resource set to be used for analog CSF and an association between the SRS resource set and a set of downlink CSI-RSs, as described above.

As further shown in FIG. 9, in some aspects, process 900 may include transmitting the set of downlink CSI-RSs (block 920). For example, the base station (e.g., using transmit processor 220, controller/processor 240, memory 242, and/or the like) may transmit the set of downlink CSI-RSs, as described above.

As further shown in FIG. 9, in some aspects, process 900 may include receiving one or more SRSs for analog CSF in the SRS resource set based at least in part on transmitting the set of downlink CSI-RSs (block 930). For example, the base station (e.g., using receive processor 238, controller/processor 240, memory 242, and/or the like) may receive one or more SRSs for analog CSF in the SRS resource set based at least in part on transmitting the set of downlink CSI-RSs, as described above.

As further shown in FIG. 9, in some aspects, process 900 may include determining a precoding matrix indicator (PMI) value based at least in part on the one or more SRSs (block 940). For example, the base station (e.g., using receive processor 238, controller/processor 240, memory 242, and/or the like) may determine a PMI value based at least in part on the one or more SRSs, as described above.

Process 900 may include additional aspects, such as any single aspect or any combination of aspects described below and/or in connection with one or more other processes described elsewhere herein.

In a first aspect, the SRS resource set is indicated using an analog CSF SRS usage that is different from a beam management SRS usage, a codebook SRS usage, a non-codebook SRS usage, and an antenna switching SRS usage.

In a second aspect, alone or in combination with the first aspect, the SRS resource set is aperiodic, periodic, or semi-persistent.

In a third aspect, alone or in combination with one or more of the first and second aspects, the set of downlink CSI-RSs is a set of NZP CSI-RSs, and the PMI value is determined based at least in part on a spatial domain transmission filter associated with the set of NZP CSI-RSs.

In a fourth aspect, alone or in combination with one or more of the first through third aspects, all SRS resources included in the SRS resource set are associated with the set of downlink CSI-RSs.

In a fifth aspect, alone or in combination with one or more of the first through fourth aspects, the SRS resource set is one of multiple SRS resource sets configured to be used for analog CSF.

In a sixth aspect, alone or in combination with one or more of the first through fifth aspects, different SRS resource sets, of the multiple SRS resource sets, are associated with different sets of CSI-RSs.

In a seventh aspect, alone or in combination with one or more of the first through sixth aspects, the association is indicated using either a CSI-RS parameter or an associated CSI-RS parameter in an SRS resource set field of the configuration.

In an eighth aspect, alone or in combination with one or more of the first through seventh aspects, the association is indicated using a spatial relation information parameter in an SRS resource set field of the configuration.

In a ninth aspect, alone or in combination with one or more of the first through eighth aspects, the set of downlink CSI-RSs are indicated using a CSI-RS index value of the spatial relation information parameter.

In a tenth aspect, alone or in combination with one or more of the first through ninth aspects, the SRS resource set is indicated using an antenna switching SRS usage for the SRS resource set.

In an eleventh aspect, alone or in combination with one or more of the first through tenth aspects, the SRS resource set is used for analog CSF when the antenna switching SRS usage is indicated in either a CSI-RS parameter or an associated CSI-RS parameter in a resource type field of an SRS resource set field of the configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration that indicates a sounding reference signal (SRS) resource set to be used for analog channel state feedback (CSF) and an association between the SRS resource set and a set of downlink channel state information reference signals (CSI-RSs), the configuration comprising a spatial relation information parameter that includes a CSI-RS index value identifying the set of downlink CSI-RSs;
   measuring the set of downlink CSI-RSs associated with the SRS resource set; and
   transmitting one or more SRSs for analog CSF using the SRS resource set and based at least in part on measuring the set of downlink CSI-RSs.

2. The method of claim 1, wherein the SRS resource set is indicated using an analog CSF SRS usage that is different from a beam management SRS usage, a codebook SRS usage, a non-codebook SRS usage, and an antenna switching SRS usage.

3. The method of claim 2, wherein the SRS resource set is configured as an aperiodic SRS resource set, a semi-persistent SRS resource set, or a periodic SRS resource set in accordance with the analog CSF usage.

4. The method of claim 1, wherein the set of downlink CSI-RSs is a set of non-zero power (NZP) CSI-RSs, and wherein the one or more SRSs are transmitted using a spatial domain transmission filter determined based at least in part on measuring the set of NZP CSI-RSs.

5. The method of claim 1, wherein all SRS resources included in the SRS resource set are associated with the set of downlink CSI-RSs, wherein the SRS resource set is one of multiple SRS resource sets configured to be used for analog CSF, and wherein different SRS resource sets, of the multiple SRS resource sets, are associated with different sets of CSI-RSs.

6. The method of claim 1, wherein the association is indicated using either a CSI-RS parameter or an associated CSI-RS parameter in an SRS resource set field of the configuration.

7. The method of claim 1, wherein the association is indicated using the spatial relation information parameter, and wherein the spatial relation information parameter is in an SRS resource set field of the configuration.

8. The method of claim 1, wherein the SRS resource set is indicated using an antenna switching SRS usage for the SRS resource set.

9. The method of claim 8, wherein the SRS resource set is used for analog CSF when the antenna switching SRS usage is indicated in either a CSI-RS parameter or an associated CSI-RS parameter in a resource type field of an SRS resource set field of the configuration.

10. The method of claim 1, wherein the one or more SRSs are transmitted using a same transmit power for each SRS port used to transmit the one or more SRSs.

11. The method of claim 1, wherein the one or more SRSs are transmitted using different transmit powers for different SRS ports used to transmit the one or more SRSs.

12. The method of claim 11, wherein a transmit power for an SRS port is scaled based at least in part on a set of singular values of measurement determined based at least in part on measuring the set of downlink CSI-RSs.

13. A method of wireless communication performed by a network entity, comprising:
transmitting a configuration that indicates a sounding reference signal (SRS) resource set to be used for analog channel state feedback (CSF) and an association between the SRS resource set and a set of downlink channel state information reference signals (CSI-RSs), the configuration comprising a spatial relation information parameter that includes a CSI-RS index value identifying the set of downlink CSI-RSs;
transmitting the set of downlink CSI-RSs;
receiving one or more SRSs for analog CSF in the SRS resource set based at least in part on transmitting the set of downlink CSI-RSs; and
determining a precoding matrix indicator (PMI) value based at least in part on the one or more SRSs.

14. The method of claim 13, wherein the SRS resource set is indicated using an analog CSF SRS usage that is different from a beam management SRS usage, a codebook SRS usage, a non-codebook SRS usage, and an antenna switching SRS usage.

15. The method of claim 13, wherein the set of downlink CSI-RSs is a set of non-zero power (NZP) CSI-RSs, and wherein the PMI value is determined based at least in part on a spatial domain transmission filter associated with the set of NZP CSI-RSs.

16. The method of claim 13, wherein all SRS resources included in the SRS resource set are associated with the set of downlink CSI-RSs, wherein the SRS resource set is one of multiple SRS resource sets configured to be used for analog CSF, and wherein different SRS resource sets, of the multiple SRS resource sets, are associated with different sets of CSI-RSs.

17. The method of claim 13, wherein the association is indicated using either a CSI-RS parameter or an associated CSI-RS parameter in an SRS resource set field of the configuration.

18. The method of claim 13, wherein the association is indicated using the spatial relation information parameter, and wherein the spatial relation information parameter is in an SRS resource set field of the configuration.

19. The method of claim 13, wherein the SRS resource set is indicated using an antenna switching SRS usage for the SRS resource set.

20. The method of claim 19, wherein the SRS resource set is used for analog CSF when the antenna switching SRS usage is indicated in either a CSI-RS parameter or an associated CSI-RS parameter in a resource type field of an SRS resource set field of the configuration.

21. A user equipment (UE) for wireless communication, comprising:
one or more memories; and
one or more processors coupled to the one or more memories, the one or more processors configured to:
receive a configuration that indicates a sounding reference signal (SRS) resource set to be used for analog channel state feedback (CSF) and an association between the SRS resource set and a set of downlink channel state information reference signals (CSI-RSs), the configuration comprising a spatial relation information parameter that includes a CSI-RS index value identifying the set of downlink CSI-RSs;
measure the set of downlink CSI-RSs associated with the SRS resource set; and
transmit one or more SRSs for analog CSF using the SRS resource set and based at least in part on measuring the set of downlink CSI-RSs.

22. The UE of claim 21, wherein the SRS resource set is indicated using an analog CSF SRS usage that is different from a beam management SRS usage, a codebook SRS usage, a non-codebook SRS usage, and an antenna switching SRS usage.

23. The UE of claim 21, wherein the set of downlink CSI-RSs is a set of non-zero power (NZP) CSI-RSs, and wherein the one or more SRSs are transmitted using a spatial domain transmission filter determined based at least in part on measuring the set of NZP CSI-RSs.

24. The UE of claim 21, wherein all SRS resources included in the SRS resource set are associated with the set of downlink CSI-RSs, wherein the SRS resource set is one of multiple SRS resource sets configured to be used for analog CSF, and wherein different SRS resource sets, of the multiple SRS resource sets, are associated with different sets of CSI-RSs.

25. The UE of claim 21, wherein the association is indicated using either a CSI-RS parameter or an associated CSI-RS parameter in an SRS resource set field of the configuration.

26. The UE of claim 21, wherein a transmit power for the one or more SRSs is based at least in part on a set of singular value decomposition values determined based at least in part on the set of downlink CSI-RSs.

27. A network entity for wireless communication, comprising:
a one or more memories; and
one or more processors coupled to the one or more memories, the one or more processors configured to:
transmit a configuration that indicates a sounding reference signal (SRS) resource set to be used for analog channel state feedback (CSF) and an association between the SRS resource set and a set of downlink channel state information reference signals (CSI-RSs), the configuration comprising a spatial relation information parameter that includes a CSI-RS index value identifying the set of downlink CSI-RSs;

transmit the set of downlink CSI-RSs;

receive one or more SRSs for analog CSF in the SRS resource set based at least in part on transmitting the set of downlink CSI-RSs; and determine a precoding matrix indicator (PMI) value based at least in part on the one or more SRSs.

28. The network entity of claim 27, wherein the SRS resource set is indicated using an analog CSF SRS usage that is different from a beam management SRS usage, a codebook SRS usage, a non-codebook SRS usage, and an antenna switching SRS usage.

29. The network entity of claim 27, wherein the set of downlink CSI-RSs is a set of non-zero power (NZP) CSI-RSs, and wherein the PMI value is determined based at least in part on a spatial domain transmission filter associated with the set of NZP CSI-RSs.

30. The network entity of claim 27, wherein all SRS resources included in the SRS resource set are associated with the set of downlink CSI-RSs, wherein the SRS resource set is one of multiple SRS resource sets configured to be used for analog CSF, and wherein different SRS resource sets, of the multiple SRS resource sets, are associated with different sets of CSI-RSs.

* * * * *